(12) United States Patent
Yeung et al.

(10) Patent No.: US 6,441,958 B1
(45) Date of Patent: Aug. 27, 2002

(54) DIGITAL IMAGING MICROSCOPE

(76) Inventors: Chak Sing Richard Yeung, Block 1, Flat A, First Floor, Peridot Court, 9 Yu Chui Street, Tuen Men, N.T. (HK); Shao Hua Dai, Room 301, 94-3, Hua Sheng Garden, Gu Gong Road; Qian Xiao, 5 Floor, Motic Building, Torch Hi-Tech Industrial Developmental Zone, both of Xiamen, Fujian Province, P.R. (CN)

( * ) Notice: Subject to any disclaimer, the term of this patent is extended or adjusted under 35 U.S.C. 154(b) by 0 days.

(21) Appl. No.: 09/821,665

(22) Filed: Mar. 29, 2001

(51) Int. Cl.$^7$ .............................................. G02B 21/18
(52) U.S. Cl. ...................... 359/372; 359/363; 359/368; 348/79
(58) Field of Search ................................ 359/363, 368, 359/369, 372, 385, 389; 348/79

(56) References Cited

U.S. PATENT DOCUMENTS

| | | | |
|---|---|---|---|
| 4,786,155 A | * 11/1988 | Fantone et al. | 356/39 |
| 5,764,408 A | * 6/1998 | Otaki | 359/368 |
| 5,886,813 A | * 3/1999 | Nagasawa | 359/383 |
| 5,933,513 A | 8/1999 | Yonevama et al. | |
| 6,147,797 A | * 11/2000 | Lee | 359/363 |

OTHER PUBLICATIONS

Leica Microsystems Ltd, "Leica DC Cameras" Downloaded file from http://www.leica.com Jun. 7, 2001; publication date unknown.
Leica Microsystems Ltd, "Leica DC Camera—Usermanual" Downloaded file from http://www.leica.com Jun. 7, 2001; publication date unknown.

* cited by examiner

Primary Examiner—Cassandra Spyrou
Assistant Examiner—Mark A. Robinson
(74) Attorney, Agent, or Firm—Barrigar Intellectual Property Group

(57) ABSTRACT

A compact digital imaging microscope includes a stage for holding a specimen, a lens assembly for collecting a beam of light transmitted through the specimen, and an adjustable beamsplitter assembly for splitting the beam between an eyepiece for viewing an image of the specimen and a CCD image detector to provide both a digital and an analog signal representing an image of the specimen. The use of a lens positioned along an optical path between the lens assembly and the image detector allows the image detector to be integrated compactly within the microscope and also allows the image detector to capture an image whose viewable area is roughly the same as that viewable through the eyepiece. Furthermore, all electrical connections (other than output and power supply connections which are located at the base of the microscope) are internalized within the microscope.

2 Claims, 17 Drawing Sheets

DIGITAL IMAGING MICROSCOPE

FIELD OF THE TECHNOLOGY

This invention relates generally to microscopes, and more particularly to a digital imaging microscope having an eyepiece for viewing and a digital camera for the electronic transmission of a digitized image of a specimen to a monitor or computer.

BACKGROUND

Digital imaging microscopy relates to the capture in digitized form of a magnified image of a specimen, for live viewing on a monitor or for processing and archiving by a computer. In certain known digital imaging microscopy systems, there is a microscope unit that resembles a standard microscope by having a light source, a specimen stage, optics for collecting and directing a light beam reflected from or transmitted through the specimen, and an eyepiece mounted at the end of an attached tube. Unlike a standard microscope, a conventional digital imaging microscope typically has a port for receiving a digital camera. The port is typically at the top of the microscope casing in the vicinity of the eyepiece. Furthermore, the optics are adapted to use a beamsplitter to direct a determined portion of the light to the camera port. A coupling adapter and a phototube provide a suitable physical connection between the microscope and the camera. As the camera and the eyepiece share the same optics, the coupling adapter together with the phototube must be dimensioned, and particularly must be of sufficient length, such that the camera lens can effectively image the beam onto the photosensitive image sensor.

Cameras employing a charge coupled device (CCD) are suitable for use in digital imaging microscopy. In a camera equipped with a CCD detector, the magnified image is digitized within the CCD camera and is transmitted as either a digital signal to a computer or as an analog signal to a monitor. The computer may be programmed with dedicated image processing and archiving software.

An example of such a digital imaging microscope is described in U.S. Pat. No. 5,933,513 (Yoneyama et al.). A commercially available example of such a system is the LEICA DC 100 Digital Imaging System manufactured by Leica Microscopy Systems Ltd. This system includes a DC 100 digital camera, a MZ12 stereo-microscope and a standard Windows-based PC computer running TWAIN and QWin image processing and archiving software. The system also has a phototube with C-mount optical adapter that is used to physically connect the digital camera to an opening at the top of the microscope casing within some suitable focal range for the digital camera. An electrical cable extends from the camera and connects to the computer via a digital frame grabber located in the computer.

Both the Yoneyama and LEICA microscopes are not compact. In particular, both systems include lengthy phototubes in part to provide the necessary focal length such that a peripherally connected camera can image the beam onto the photosensitive CCD image sensor, and in part to allow for the insertion of other optical devices such as filters between the magnifier and the camera. Furthermore, as the camera in each of these systems is a discrete device separate from the microscope, the camera and any other peripherally connected optical devices must be carefully calibrated each time the camera is mounted to the microscope. Further, each device may require its own power cable and data transmission cables which may interfere with the effective or convenient operation of the microscope. Lastly, these systems allow the camera to capture only a small portion of the image viewable from the eyepiece. While the Yoneyama and LEICA microscopes may be adaptable for a variety of uses, they are also cumbersome to operate for the novice or intermediate microscopist.

Other known digital microscopy systems include an adapter for affixing a digital camera over the eyepiece of a conventional microscope. The main drawback of such systems is that direct viewing and digital imaging cannot occur at the same time.

SUMMARY OF THE INVENTION

The object of the present invention is to provide a relatively compact and relatively inexpensive digital imaging microscope having at least some of the following characteristics and, in a preferred embodiment, having all of them:

(1) a compact assembly of optical components;

(2) means to deliver all the available light from the specimen to the image detector thus maximizing the quality of the images produced;

(3) an integrated digital image detector which needs only be calibrated once;

(4) means to capture a relatively large portion of the image available from the magnifying objective lens, the captured image area being roughly equivalent to that viewable through the eyepiece;

(5) means to provide an electronic signal representing the captured image in both analog and digital form;

(6) a single power connector for all the system components; and (7) a convenient means to connect power and data cables at the base of the assembly.

One embodiment of the invention provides a digital imaging microscope for viewing and capturing an image of a specimen. The elements of the preferred embodiment listed in this paragraph are conventional. The microscope assembly has a base, a hollow bent arm extending generally upward from the base, a light source located either in the base or attached to the arm, a stage for receiving a specimen to be viewed, an objective lens, an optical component housing in the vicinity of the top of the arm, and an eyepiece. The objective lens is mounted on the microscope on the underside of the upper part of the arm along an unimpeded optical path from the specimen. The objective lens may be one of several mounted in a carousel. The user sets the microscope's magnification by rotating the carousel so that a selected objective lens is positioned over the specimen. The objective lens collects light transmitted through the specimen and transmits it to a beamsplitter located in the housing. The beamsplitter splits the light arriving from the objective lens into two beams. One beam is directed to the eyepiece and the second beam to a digital image detector.

In a conventional digital imaging microscope, the digital image detector is located outside the optical component housing within a camera that is attached as a separate device by means of an adapter and a phototube. The eyepiece provides a magnified virtual image of the specimen observable with the human eye and the digital image detector converts the magnified image of the specimen into an analog electronic signal.

According to the one aspect of the invention, a beamsplitter assembly, positive lens and an image detector are provided within the optical component housing. This provides a compact design.

The beamsplitter assembly holds a plurality of prisms in a tray which may slide transversely to allow the user to select a prism to control the division of light between the eyepiece and the digital image detector. Preferably, at least three prisms are provided. A suitable set of prisms comprises a splitting prism, which splits the light collected equally between the eyepiece and the digital image detector, a columnar prism, which transmits all of the available light to the digital image detector, and a reflecting prism, which reflects all of the light to the eyepiece. This arrangement enables the microscope to be operated in three distinct modes:

(1) a direct viewing mode, in which all light is directed to the eyepiece;

(2) a digital imaging only mode, in which all light is directed to the image detector; and (3) a dual viewing mode where light is directed to both the eyepiece and the image detector.

This arrangement provides the user with considerable flexibility. Direct viewing mode provides best viewing through the eyepiece as the image is of maximum intensity. Digital imaging only mode maximizes the light intensity available for image detection. Dual viewing mode allows one person, possibly a teacher, to operate the microscope with the aid of the eyepiece, while a number of other viewers, possibly students in a class, can watch on a standard monitor or on computer screens.

The positive lens is interposed between the beamsplitter assembly and the digital image detector so that it focuses the light from the beamsplitter onto the image detector. The use of the positive lens permits the image detector to be mounted within the optical component housing in close proximity to the beamsplitter, while still imaging a substantial portion of the image viewable through the eyepiece. This arrangement facilitates a compact design. The positive lens may preferably be mounted so that it can slide vertically within the optical component housing thus providing a means to focus the image onto the digital image detector.

A suitable image detector is a CCD. The CCD sensor captures an image of the specimen and converts this to an analog electronic signal which is transmitted by signal wires and electrical connectors to one or more RCA or S-type ports and to an analog/digital converter. The output of the analog/digital converter is directed to a USB output port.

According to a second aspect of the invention, the analog/digital converter, power supply, output ports and other electronic components are preferably located in the microscope base contributing to a compact and efficient design, free of cable connections at other parts of the microscope.

A microphone may optionally be provided on the microscope. The microphone is connected electrically to the image detector. The audio output of the image detector is sent either as an analog signal to, for example, an RCA audio port or, after digitization by the analog/digital converter, to a USB port, both output ports being located in the microscope base.

According to another embodiment of the invention, the beamsplitter assembly holds a single splitting prism mounted over the aperture. This splitting prism divides the light from the objective lens into two parts, one passing by reflection to the eyepiece and the other by transmission to the digital image detector. A suitable splitting prism comprises a semi-pentagonal shaped splitting prism joined to a compensatory prism having a reflectance-to-transmission split ratio of 1:1.

According to another embodiment of the invention, the microscope provides a stereoscopic, magnified image viewable through a pair of eyepieces and the means to capture a magnified image of the specimen with a digital image detector. This embodiment is generally the same as the preferred embodiment with the revisions described below to accommodate stereoscopic viewing.

The stereoscopic microscope suitably comprises a pair of eyepieces each having an eyepiece tube and a lens. In this embodiment, the carousel holds pairs of objective lenses. The carousel may be rotated to place a selected pair of objective lenses beneath the aperture at the bottom of the optical component housing such that light arriving from the specimen may be collected by the lens pair and transmitted to the beamsplitter assembly. The beamsplitter assembly has a pair of reflecting prisms, both placed over the aperture. For stereoscopic viewing through the eyepieces, both reflecting prisms direct light arriving from the objective lenses to the eyepieces. For imaging with the image detector, one reflecting prism is moved out of the light path thus allowing a beam to pass to a mirror, through a right-angle prism and the positive lens to the digital image detector. As in the earlier-described embodiment, the positive lens makes it possible to position the digital image detector close to the positive lens while at the same time capturing a substantial portion of the image viewable by means of the eyepiece.

According to another embodiment of the invention, a pair of objective lenses is provided to magnify the image of the specimen for stereoscopic viewing through the two eyepieces together with a third objective lens to capture an image on a digital image detector, Separate apertures in the optical component housing are provided for each of the three objective lenses. The beamsplitter assembly has two prisms. One prism receives light arriving from two objective lenses and reflects these beams to the eyepieces. The second prism redirects the light collected by the third objective lens through a positive lens to the digital image detector. As in the earlier-described embodiment, the positive lens makes it possible to position the digital image detector close to the positive lens while at the same time capturing a substantial portion of the image viewable by means of the eyepiece.

BRIEF DESCRIPTION OF THE DRAWINGS

The invention is described in detail with reference to the drawings.

DESCRIPTION OF THE PREFERRED EMBODIMENT

The embodiments of the invention will be described with reference to the accompanying drawings.

Figure 1:
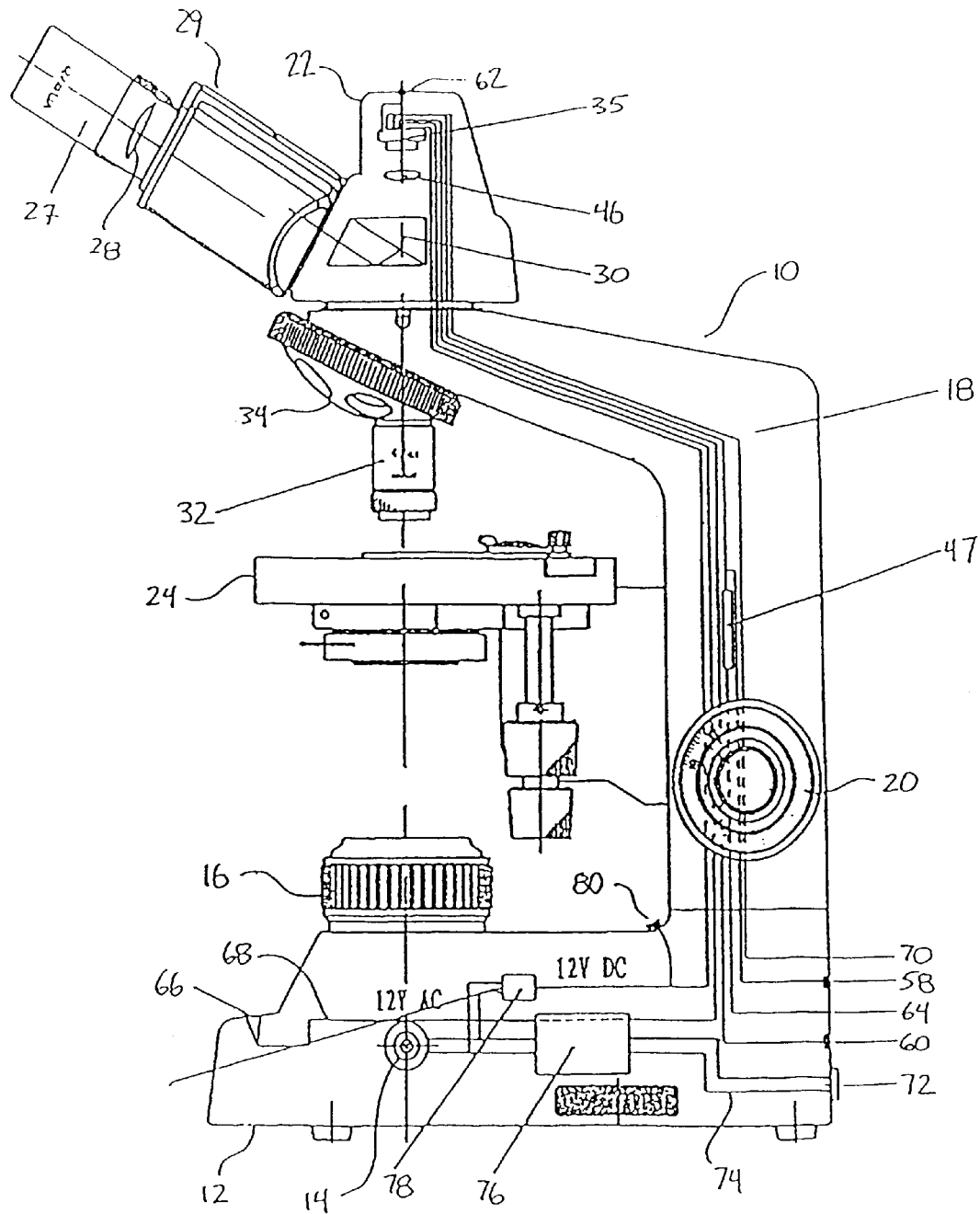
FIG. 1 is a schematic partial cut away side view of an imaging microscope according to a first embodiment of the invention.

Referring to FIG. 1 and according to the first embodiment of the invention, a digital imaging microscope 10 has a base 12 in which a light source 14 and collector lens 16 are provided in vertically stacked alignment, an arm 18 extending upwards from the base 12 having a focus control device 20, and an optical component housing 22 attached to the upper end of the arm 18 and positioned in vertical alignment over the light source 14 and the collector lens 16.

A stage 24 is connected to the arm 18 such that it is positioned between the optical component housing 22 and the collector lens 16. A specimen S may be placed on the stage 24 such that the specimen is in vertical alignment with the light source 14, collector lens 16 and the optical component housing 22. The stage 24 is vertically movable relative to the arm 18 by adjusting the focus control device 20.

An operator looking through an eyepiece 27 at the proximal end of an eye tube 29 sees an image of specimen S illuminated by the light source 14, and magnified by an eyepiece lens 28 and an objective lens selected from a cluster of lenses 32 (for the sake of clarity, only one objective lens is shown in FIG. 1). The eyepiece lens 28 is located inside the eye tube 29. As the eye tube 29 is mounted to the optical component housing 22 such that the view through the eyepiece 27 is not along a direct optical path from the stage 24, a beamsplitter assembly 30 is provided to suitably redirect the light collected by the objective lens to the eyepiece. The beamsplitter assembly 30 is mounted inside the optical component housing 22 and is positioned along an optical path from the stage 24 and collector 16. The objective lenses 32 are each removably mounted on a rotatable carousel 34 which is in turn affixed to the bottom of the optical component housing 22. Each objective lens 32 may be rotated into an active position that is along an optical path with both the beamsplitter assembly 30 and the specimen on the stage 24.

Figure 2:
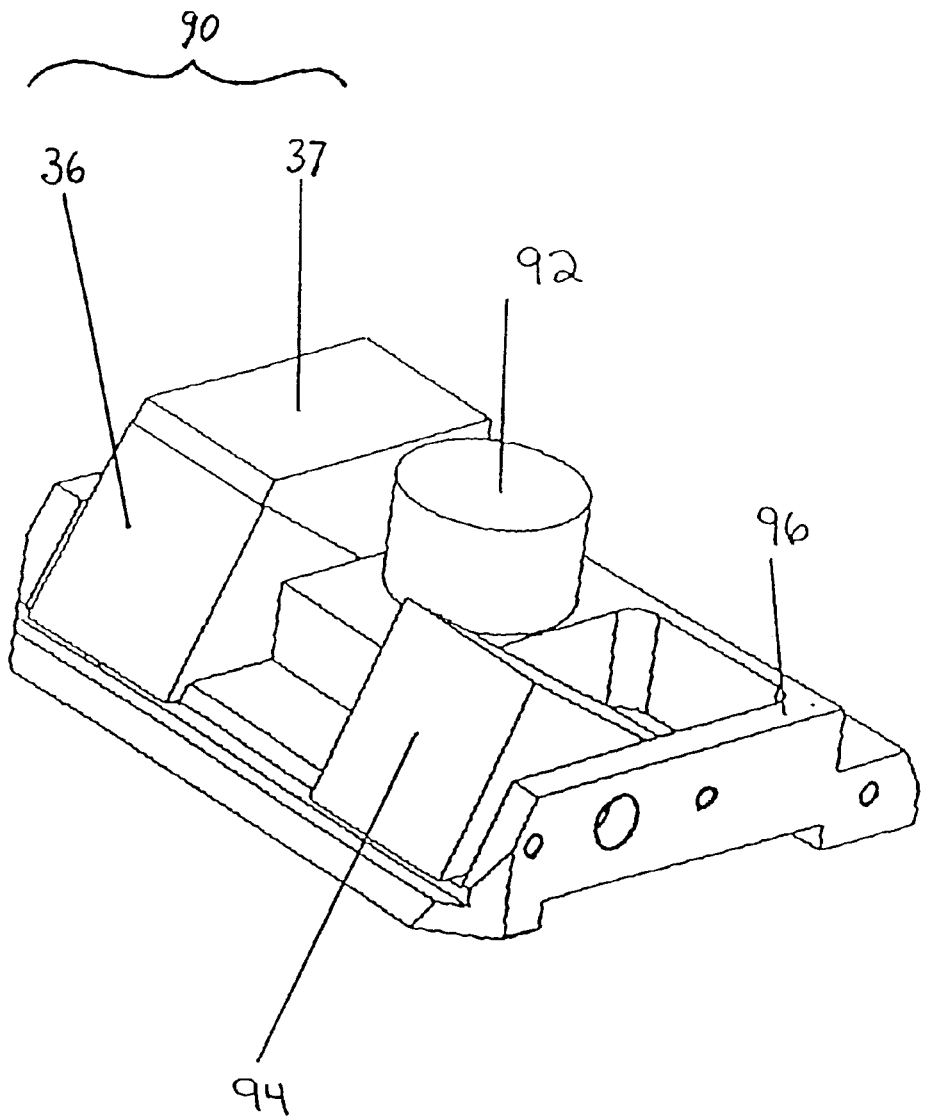
FIG. 2 is a schematic perspective view of a beamsplitter assembly according to a second embodiment of the invention.

With reference to FIG. 2, the beamsplitter assembly 30 comprises three prisms, namely a composite prism 90 (further comprising splitting prism 36 and compensatory prism 37), columnar prism 92 and reflecting prism 94 that are mounted laterally spaced apart from each other on a sliding prism holder 96. The prisms in the beamsplitter assembly all have the same refractive index. Composite prism 90 is constructed from a semi-pentagonal splitting prism and a 30 prism. The composite prism 90 splits the beam into two beams of equal intensity, one of which is reflected to the eyepiece (not shown) and the other for transmission to the image detector (not shown). Columnar prism 92 transmits all incident light to the image detector and no image is reflected to the eyepiece. Columnar prism 92 is necessary to ensure that the focal plane at the image detector does not move when the beamsplitter assembly is switched between image detector only mode (when all light rays are transmitted directly upwards towards the image detector) and dual mode (when light rays are split between the eyepiece and the image detector), thus avoiding the need to adjust the location of the image detector. Semi-pentagonal reflecting prism 94 reflects all incident light towards the eyepiece. No light is transmitted to the image detector.

Figure 4:
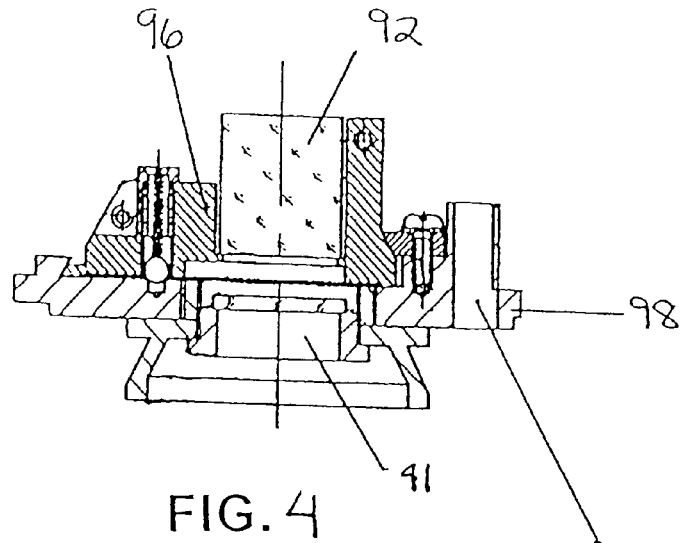
FIG. 4 is a side elevation view of the beamsplitter assembly of FIG. 2.
Figure 3:
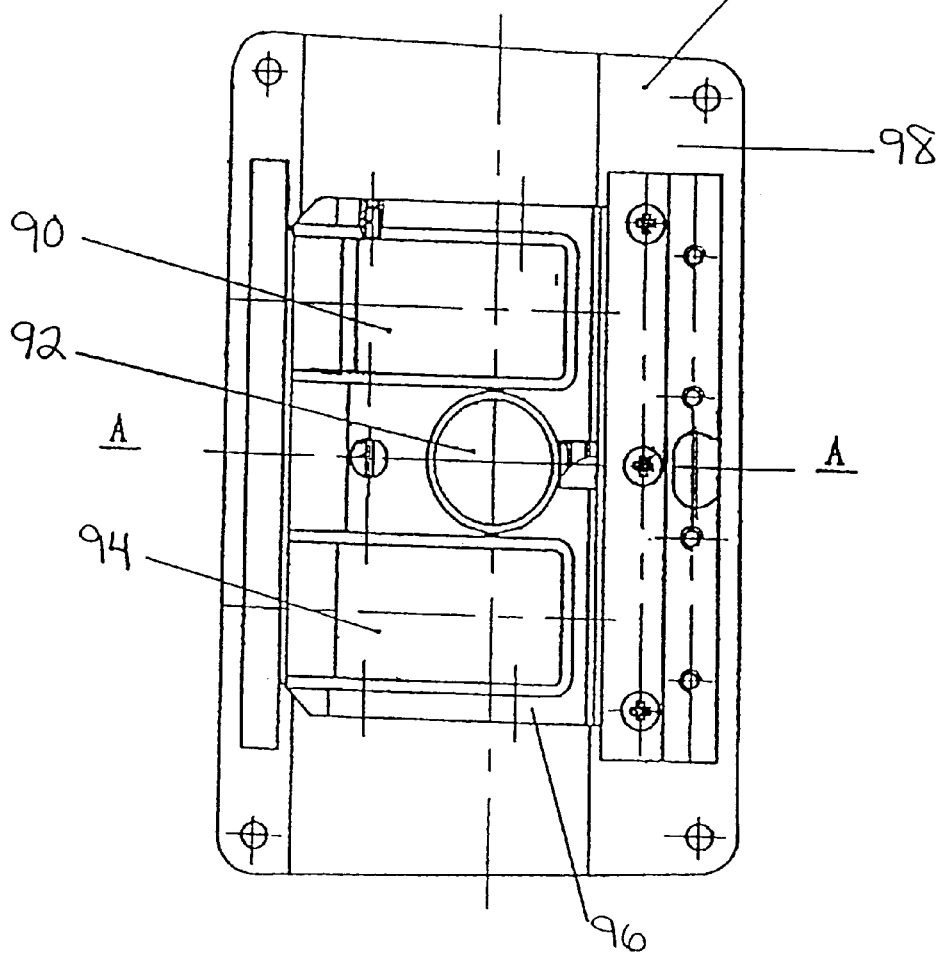
FIG. 3 is a plan view of a the beamsplitter assembly of FIG. 2.

With reference to FIGS. 3 and 4, the prism 90, 92, and 94 on holder 96 may slide horizontally along a lateral channel in linking base 98. Linking base 98 is affixed to the bottom of the optical component housing (not shown) and has an aperture therein 41. The linking base 98 is positioned in the optical component housing such that the aperture 41 is directly over the active objective lens (not shown). The holder 96 may slide so that each one of the prism 90, 92, 94 may be placed into an active position directly over the aperture 41 with an uninterrupted vertical optical path with the active objective lens. This enables the microscope to be operated in one of three modes: an eyepiece-only mode wherein the reflecting prism 94 is in the active position, an image detector only mode wherein the columnar prism 92 is in the active position, and a dual mode with the composite prism 90 in the active position. This provides the following advantages:

(1) the user may select eyepiece only mode to maximize the intensity of the image at the eyepiece;

(2) the user may select image detector only mode to maximize the intensity of the image at the image detector; and (3) the user may avoid undue aging of the image detector by reducing the image detector's unnecessary exposure to light.

Figure 5:
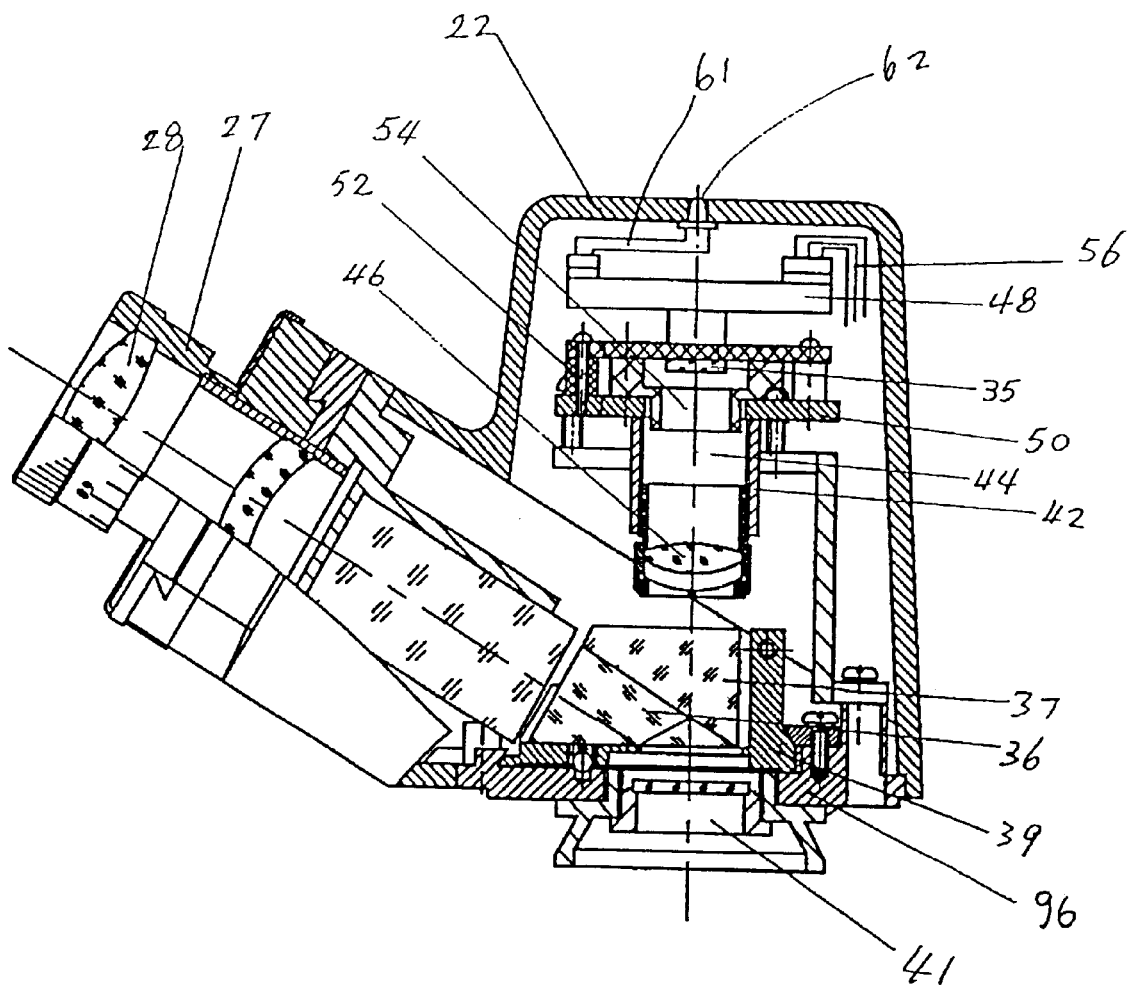
FIG. 5 is a sectional side view of an eyepiece and an optical component housing of the microscope in FIG. 1.

With reference to FIGS. 1 and 5, a positive lens 46 is provided for imaging the beam transmitted through the beamsplitter assembly onto the image detector 35 such that the image detector may be placed in relatively close proximity to the beamsplitter assembly. Furthermore, by using a photographic lens of 0.36× magnification, approximately 90% of the available image can be captured by the image detector.

With reference to FIG. 1, the image detector 35 also emits a signal carried by an electrical conduit 61 to an LED emitter 62 at the top of the optical component housing 22 indicating that the microscope is operational.

Figure 6:
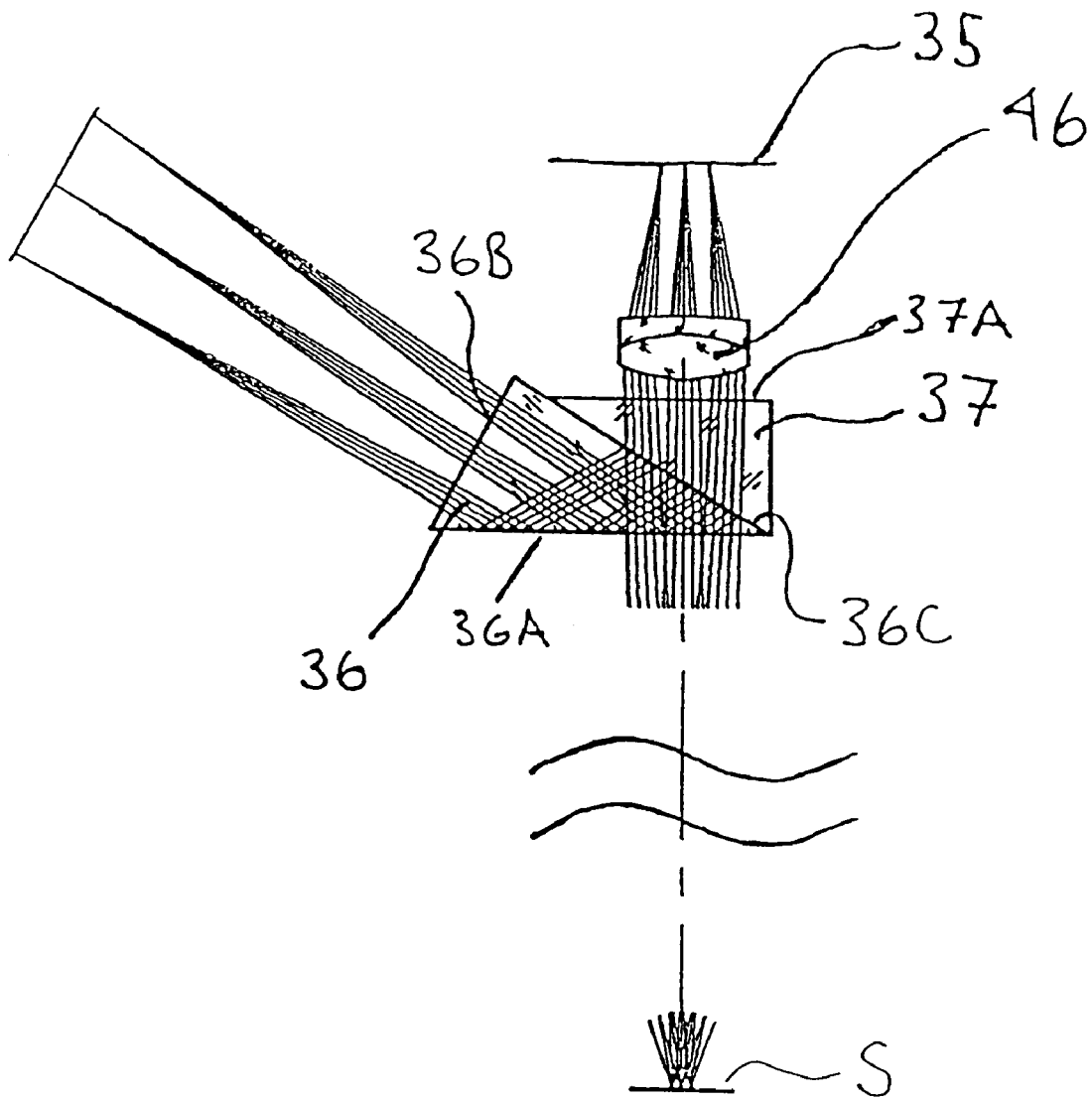
FIG. 6 is a ray trace diagram of the optical path of the microscope in FIG. 1.

FIG. 6 shows a ray trace of light through the composite prism 90. Incident light enters prism 36 through the boundary plane 36A. This beam is partially transmitted through surface 37A and partially reflected by the angled plane 36C through surface 36B. Compensatory prism 37 is necessary to compensate for the different refractive indices of air and glass. In order that the light rays may continue along in the same direction as before passing through the prism medium, it is necessary that the outer boundaries of the prism medium (36A and 37A) be aligned.

Furthermore, in order to integrate the image detector 35 within the body of the microscope 10 and maintain the relatively compact dimensions of a conventional microscope, the positive lens 46 is provided to form an image plane close to the beamsplitter assembly 30. Without such a positive lens, a video tube long enough to provide the sufficient focal length would be required, thus making a compact design impractical.

Figure 8:
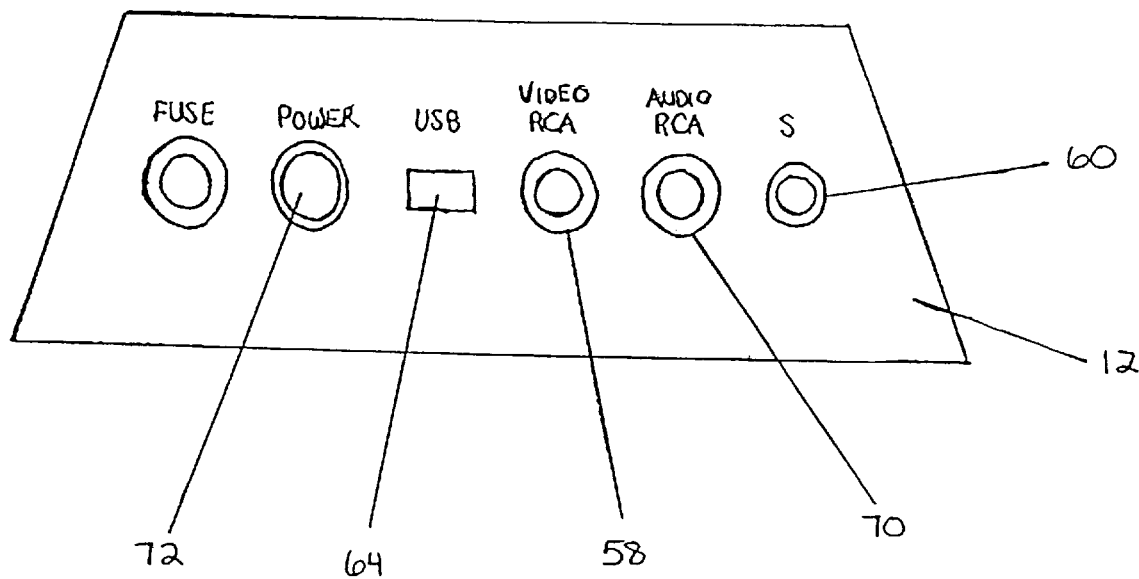
FIG. 8 is a schematic view of the base of microscope having a plurality of output ports.

The image detector may suitably be a Panasonic CCD sensor (part no. MN37777PT) or a Sony CCD sensor (part no. ICX054AK/58AK). Such cameras output analog video signals. The analog video signal is carried by a dedicated electrical wire in a signal conduit 56 (FIG. 2) and split into three separate identical signal wires. Two wires transmit the video signal to a RCA video output jack 58 and S-type video output jack 60 respectively, both of which are located at the microscope base 12 (FIG. 8). An analog video monitor (not shown) may be connected to the RCA jack 58 to display the images captured by the image detector 35.

Figure 7:
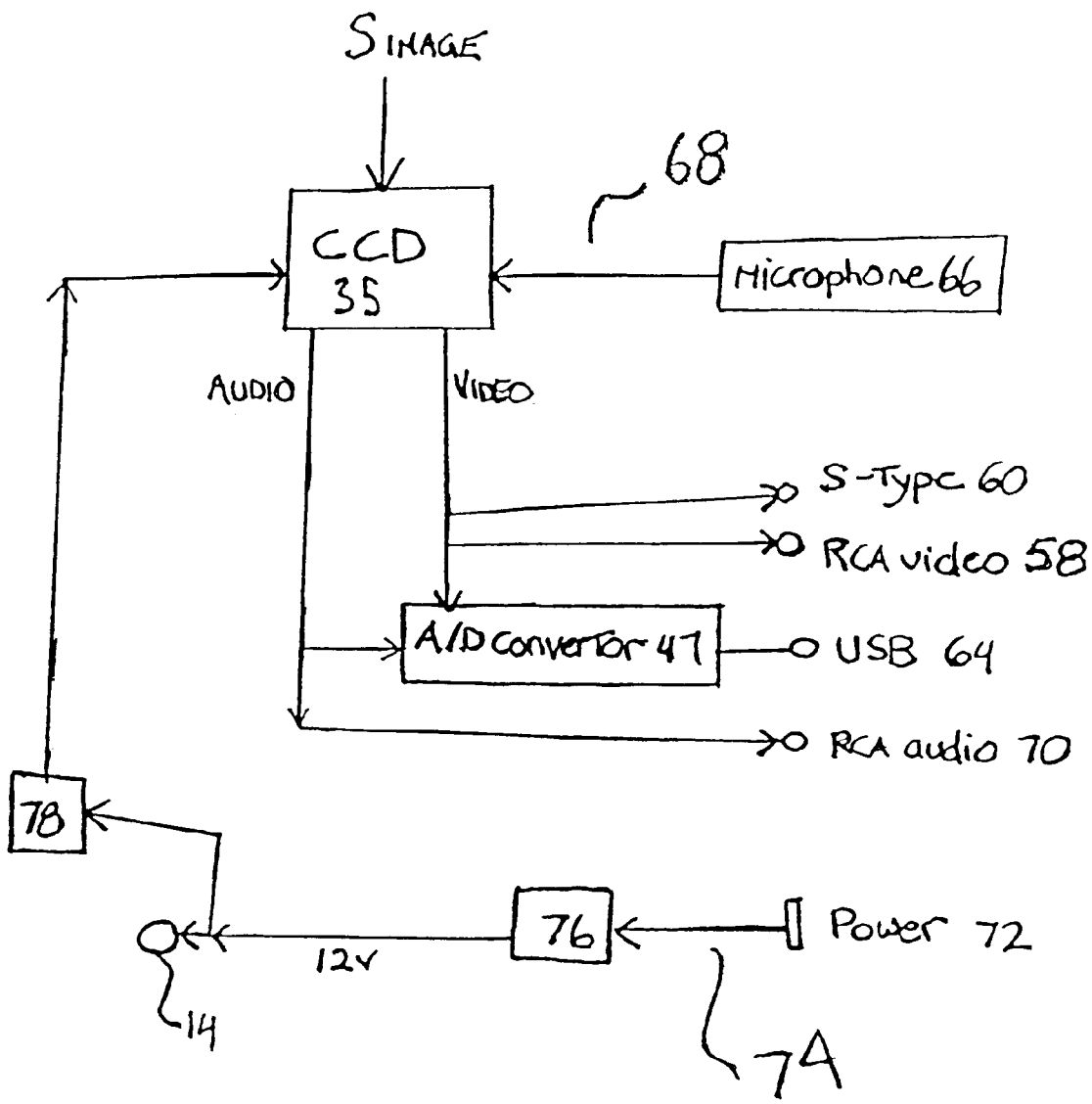
FIG. 7 is a schematic circuit diagram showing the electrical connections between the image detector to the various components of the microscope of the invention.

The third video signal wire transmits the video signal to an analog/digital converter 47 (FIG. 7). The analog signal is converted to a digital signal then transmitted to a USB port 64 (FIG. 8). A computer (not shown) may be connected to the microscope 10 via the USB port 64. The analog/digital converter 47 is a USB video grabber, comprising a Phillips SAA711A video decoder having an analog video in port and a YUV and IIC signal out ports, a NOGATECH NT1003-1 video camera I/F controller (with compression) electrically connected to and communicative with the video decoder video out ports and having a digital video signal out port connected to the USB port 64, and DRAM electrically communicative with the video camera I/F controller.

The software interface for communicating with the USB port is Microsoft Video for Windows driver and TWAIN interface. This software may be suitably operated on a Windows based computer having a USB port. The computer and related software are beyond the scope of this invention and are not further described here.

Referring to FIGS. 1 and 7, a microphone 66 is mounted at the front of the base 12 to record the user's oral comments. An analog electrical signal is transmitted from the microphone to the image detector 35 via signal wire 68. The microphone output signal from the image detector 35 is then split into two signals, one of which is directed to the analog/digital converter 47 for conversion into a digital signal, and then sent to the USB coupling 64. The other signal (analog) is sent to a second RCA coupling 70 that is dedicated to audio signals.

Referring to FIG. 1, AC power is supplied to the microscope via a power socket 72. Power lines 74 transmit the electricity to a voltage transformer 76 that converts the voltage to 12V AC. The 12V AC is used to power the light source 14. An AC-to-DC converter 78 including a wavelength rectifier, a filter, and a stabilizer (not shown), converts the current into 12V DC. The 12V DC is then directed to the circuits which drive the image detector 35. The DC circuit is closed by turning on a switch 80 located on the base 12. Alternatively, an external source of 12V DC can be used to supply power to the circuits which drive the image detector (not shown).

As seen in FIG. 7, the microscope 10 can simultaneously transmit analog and digital video and audio signals. This enables a variety of devices to be connected to the microscope 10 at one time, such as a television monitor to the RCA video or S-type ports 58, 60, an audio recorder to the RCA audio port 70, and a computer to the USB port 64.

Figure 9:
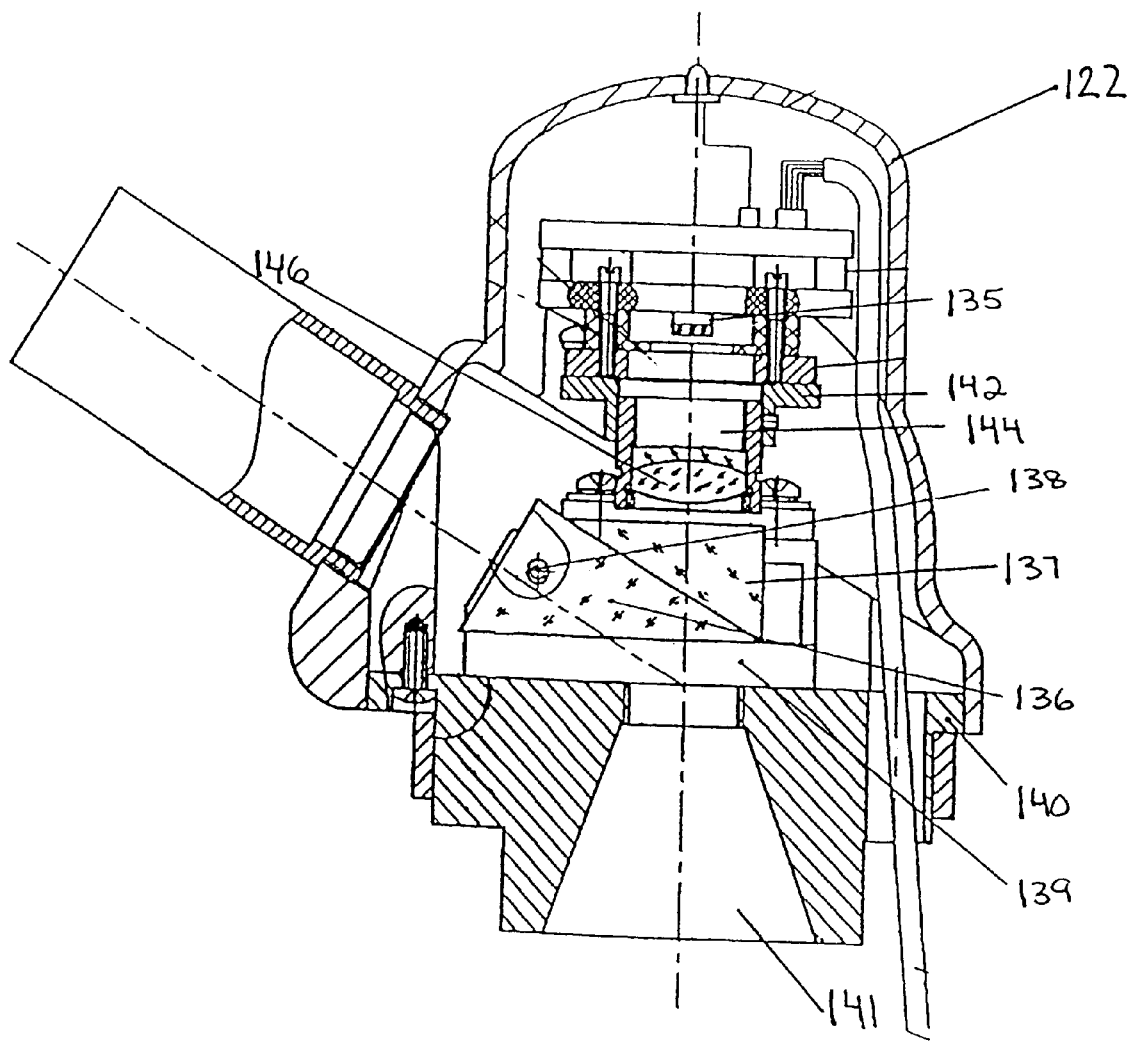
FIG. 9 is a sectional side view of an eyepiece and an optical component housing of the microscope according to a second embodiment of the invention.
Figure 10:
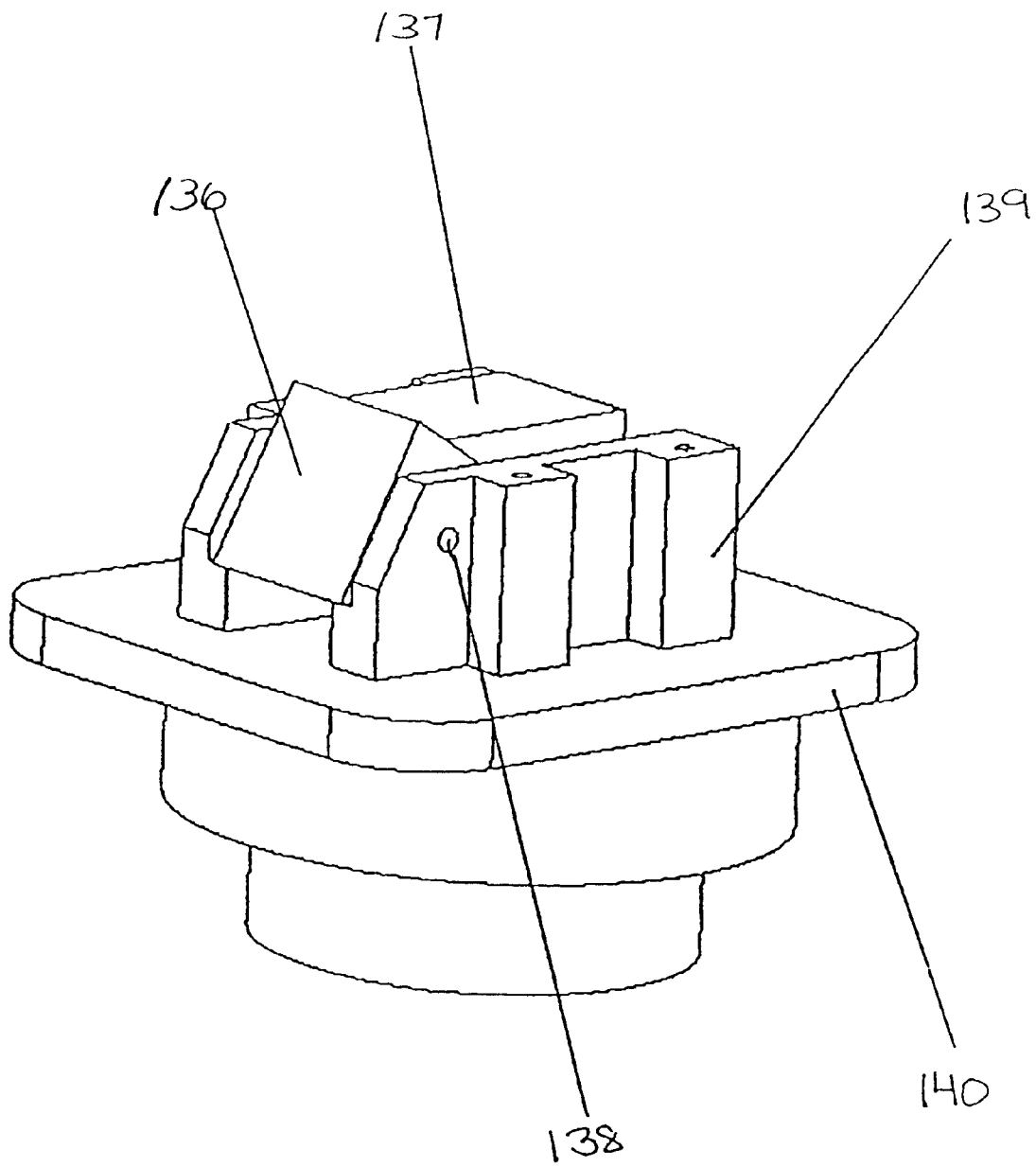
FIG. 10 is a schematic perspective view of a beamsplitter assembly of the microscope in FIG. 9.
Figure 11:
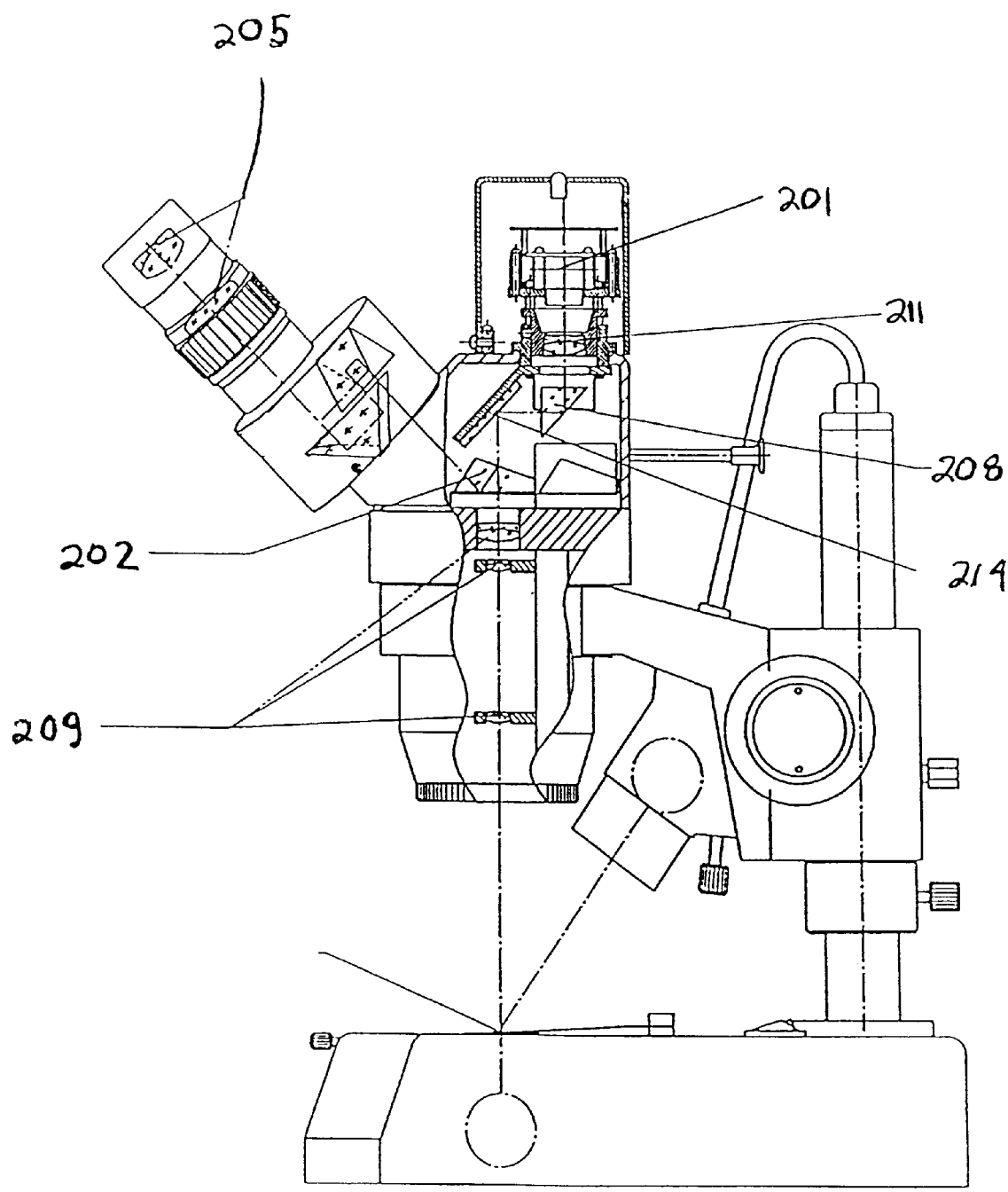
FIG. 11 is a schematic partial cut away side view of an imaging microscope according to a third embodiment of the invention.
Figure 12:
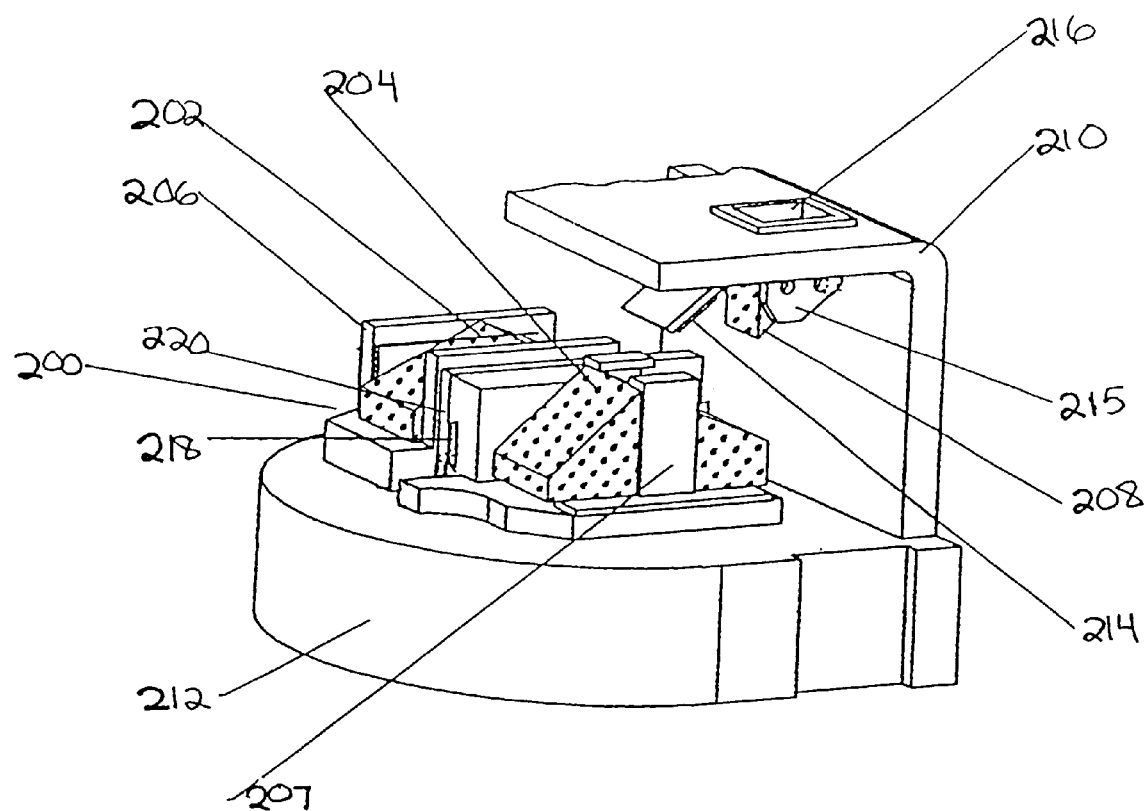
FIG. 12 is a schematic perspective view of a beamsplitter assembly according to a third embodiment of the invention.
Figure 14:
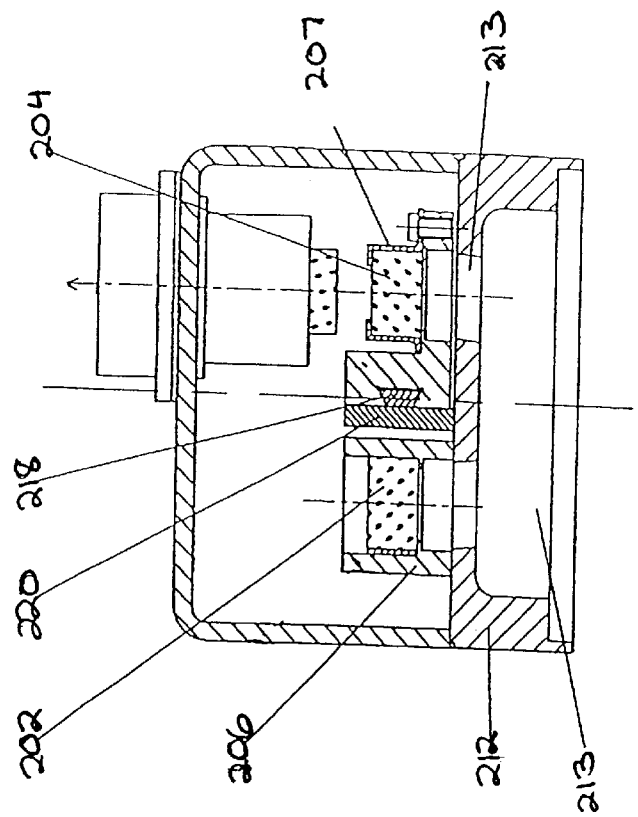
FIGS. 13 and 14 are sectional side and front views of the beamsplitter assembly of FIG. 12.
Figure 13:
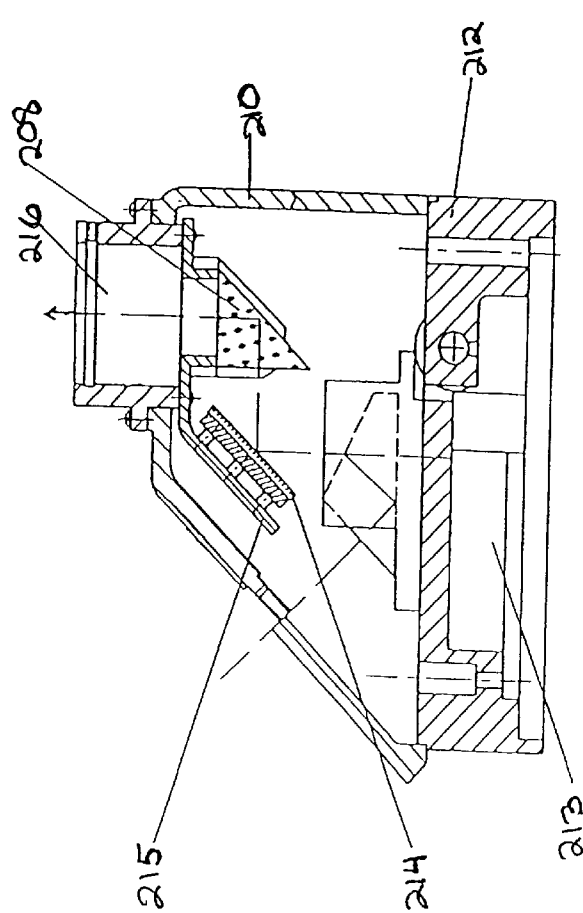

FIGS. 9 and 10 illustrate a simplified embodiment of the microscope wherein a beamsplitter assembly 130 has a single splitting prism and is otherwise as in the first embodiment. The beamsplitter assembly 130 comprises a pair of prisms 136 and 137. A semi-pentagonal prism 136 is stacked beneath a 30 compensatory prism 137. Both prisms 136, 137 have a refraction index of 1.5163. The semi-pentagonal prism 136 splits the total light intensity of the beam collected by the objective lens (not shown) equally between the eyepiece (not shown) and the image detector 135 (via the 30 prism). A fixing screw 138 and cushion plate assembly (not shown) inserted between prism holder 139 and prisms 136, 137 serve to protect and to fasten the prisms 136, 137 within the prism holder 139. The prism holder 139 rests on a prism bench 140 mounted to the bottom of the optical component housing 122 and above the carousel (not shown). An aperture 141 is provided through the prism holder 139 and prism bench 140 such that an uninterrupted optical path is provided between the prisms 136, 137 and the objective lens (not shown).

A lens holder 142 is mounted above the beamsplitter assembly 130. An aperture 144 is provided through the lens holder 142 so that an uninterrupted optical path is provided between the compensatory prism 137 and image detector 135. Mounted to the lens holder 142 in the aperture 144 and between the image detector 135 and the compensatory prism 137 is a positive lens 146 having a magnification of 0.36×. The lens holder 142 may slide vertically to enable focussing of the specimen image on the image detector 135 by vertically moving the lens 146. Once the lens 146 has been satisfactorily positioned, it is fixed in place by a horizontally mounted fixing screw 138.

FIGS. 11 to 15 illustrate a third embodiment of the invention. The microscope is as described in the first embodiment except:

(1) the microscope is modified to provide stereoscopic viewing of the specimen image; and (2) the beamsplitter assembly is designed to provide simultaneous monocular imaging by the image detector 201 and stereoscopic viewing by the user.

The elements that provide stereoscopic direct viewing are conventional and may be implemented by a person skilled in the art. They do not require elaboration nor detailed explanation. In short, a pair of eyepieces are provided in respective eye tubes. A carousel holds a plurality of objective lenses such that separate pairs of objective lenses may be rotated into an active position wherein each objective lens of the pair collects and magnifies a beam of light from the specimen onto a beamsplitter assembly which in turn reflects the beams to the pair of eyepieces.

According to the invention, the beamsplitter assembly 200 reflects a beam of light to each eyepiece 205 and to the image detector 201. The beamsplitter assembly 200 has a pair of splitting prisms 202, 204 and a right angle prism 208. The splitting prisms 202, 204 are mounted laterally apart on a prism bench 212 such that each prism 202, 204 is over an aperture 213 in the bench 212 and is positioned along an uninterrupted vertical optical path with one of the pair of active objective lenses 209. Prism 202 is fixedly mounted to the prism bench 212 by holder 206. Prism 204 is mounted to the prism bench by holder 207. Holder 207 may slide horizontally relative to the bench 212. A horizontally extending channel 218 on holder 207 mates with horizontally extending flange 220 that is fixedly attached to the bench 212 to constrain the horizontal sliding to one dimension.

An arm 210 extends generally upwards from the bench 212 and is shaped like an inverse "L" such that the horizontal portion of the L extends laterally over the prism 204. Mounted to the underside of the horizontally extending portion of the arm 210 is the right angle prism 208 and a reflecting mirror 214. The right angle prism 208 and reflecting mirror 214 are positioned on the arm 210 by mounts 215 such that they are above splitting prism 204 and such that incident light is reflected by the reflecting mirror 214 onto the right angle prism 208 and further reflected by the prism 208 upwards through an aperture 216 in the laterally extending top portion of the arm 210, and to the image detector 201.

Figure 15:
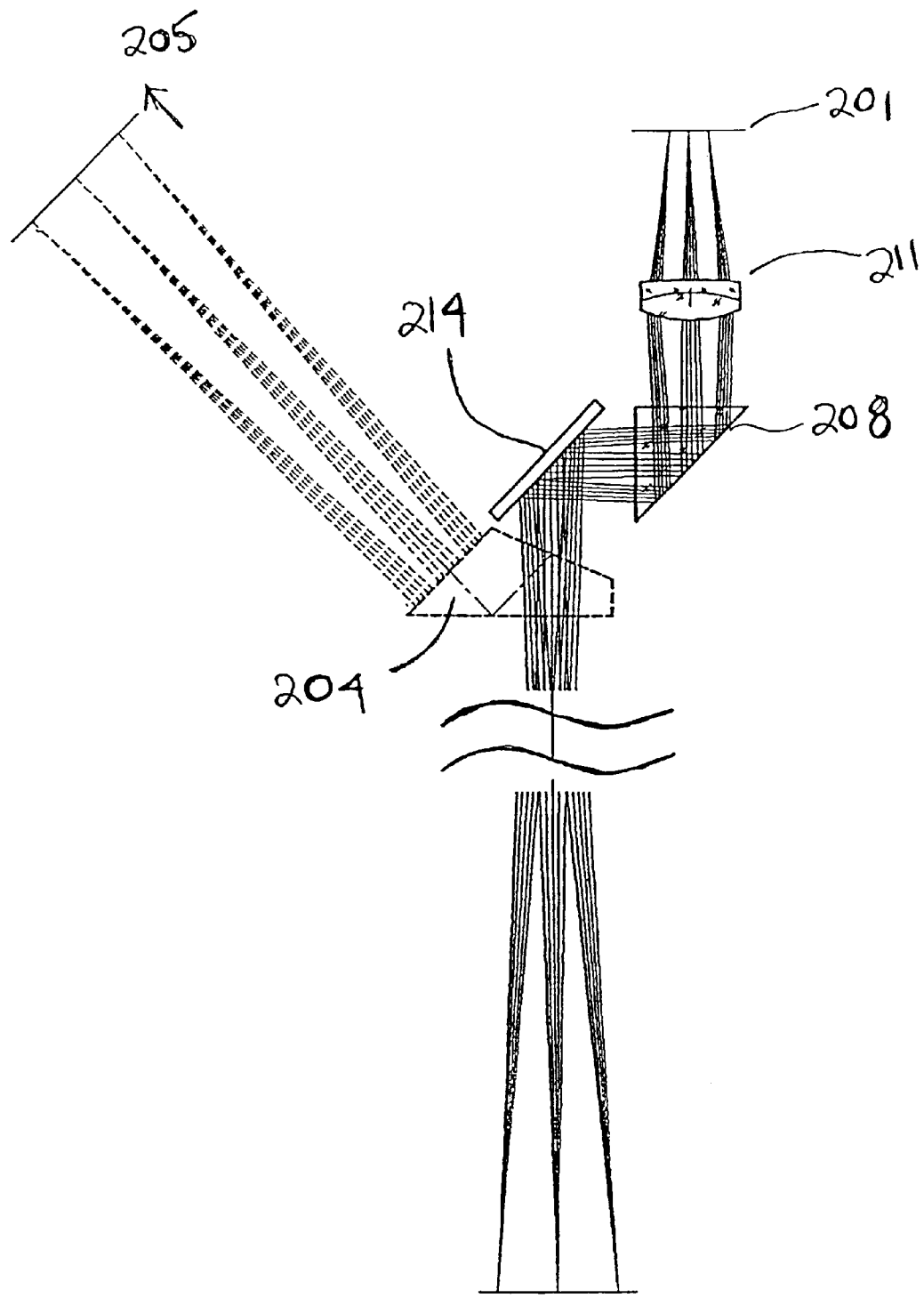
FIG. 15 is a ray trace diagram of the optical path of the microscope according to a third embodiment of the invention.
Figure 16:
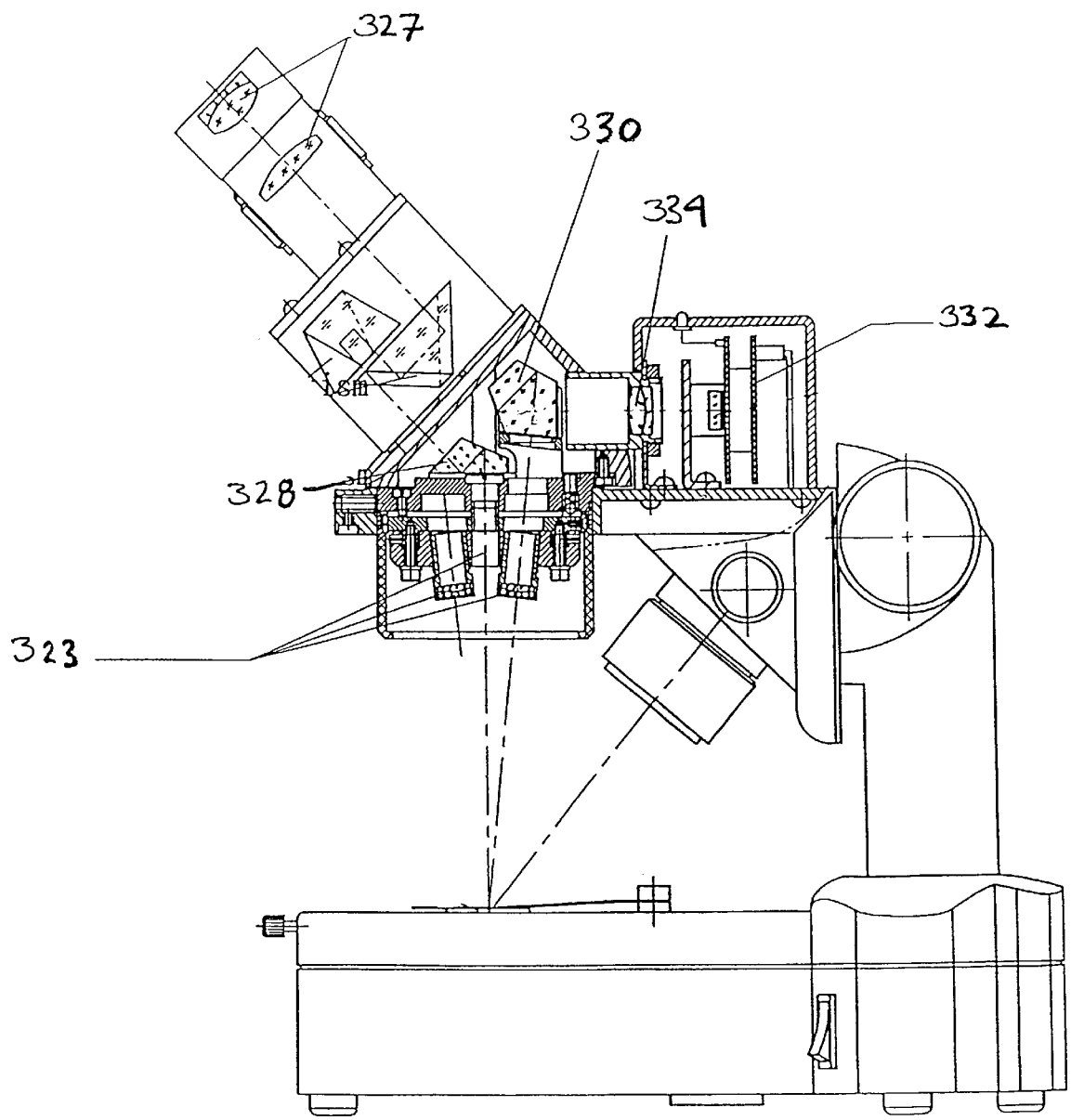
FIG. 16 is a schematic partial cut away side view of an imaging microscope according to a fourth embodiment of the invention.

As shown in FIG. 15, the light beam collected by the active objective lens that is directed towards splitting prism 204 is split into two beams by splitting prism 204 as described in the first and second embodiments such that:

(1) one of the beams emerging from splitting prism 204 is transmitted upwards and is reflected by the mirror 214 and prism 208 through aperture 216 for capture by the image detector 201; and (2) the second beam emerging from splitting prism 204 is reflected and redirected towards one of the pair of eyepieces 205.

The light beam collected by the other active objective lens is directed towards splitting prism 202 where it is split into two beams. One of the beams emerging from splitting prism 202 is reflected towards one of the eyepieces 205. The other beam emerging from splitting prism 202 is transmitted upwards and is not used. The use of splitting prism 202 is necessary to provide an image of equal light intensity to both eyepieces.

In order to increase the amount of light directed to the image detector 201, splitting prism 204 may be moved in a horizontal direction so that all light otherwise incident on splitting prism 204 is transmitted to the image detector 201.

As in the first embodiment of the microscope, a positive lens 211 is provided for imaging the beam transmitted through the splitting prism 204 onto the image detector 201 such that the image detector may be mounted in relatively close proximity to the beamsplitter assembly and the image detector captures a substantial portion of the image viewable by the eyepiece 205. A 16 mm diameter photographic lens of 0.32× magnification provides a focal length of 40.77 mm, thereby enabling approximately 91% of the image to be captured by the image detector 101.

FIGS. 16 to 20 illustrate a fourth embodiment of the microscope invention. The microscope is the same as described in the third embodiment except that the design has been modified to provide a dedicated pair of active objective lenses to magnify an image for eyepiece viewing, and another dedicated objective lens for imaging by an image detector. These modifications are described in the following paragraphs.

Figure 17:
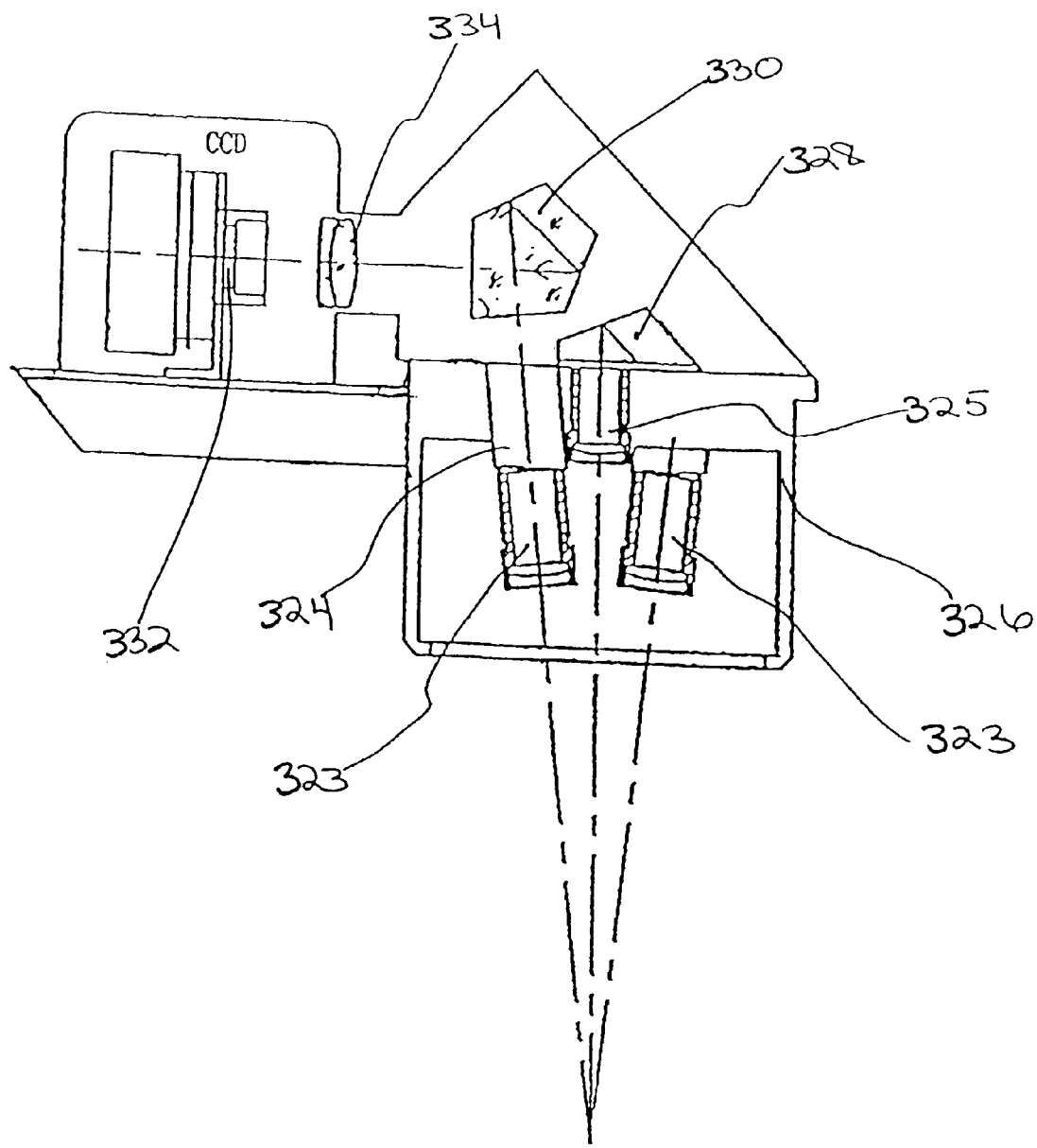
FIG. 17 is a schematic side view of a fragment of a microscope according to a fourth embodiment of the invention, illustrating an image detector, positive lens, beamsplitter assembly and objective lenses of the microscope.
Figure 18:
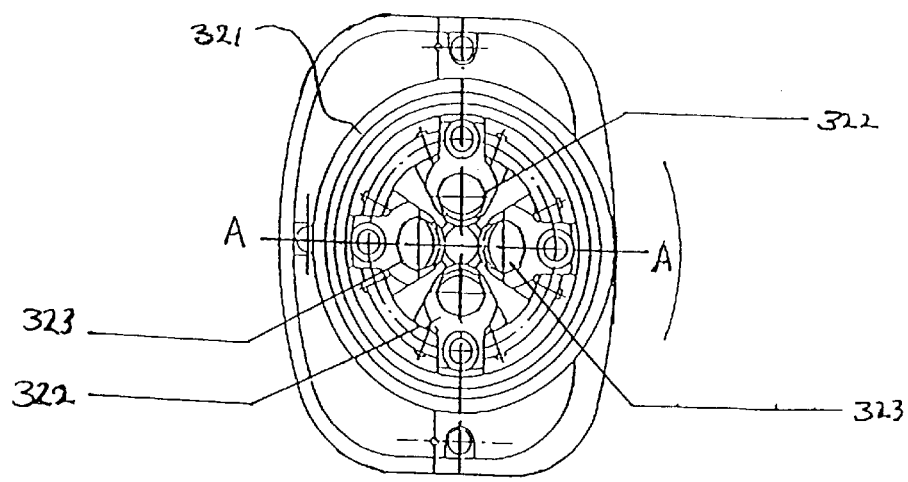
FIG. 18 is a schematic bottom view of a carousel and cluster of objective lenses of the microscope illustrated in FIG. 17.
Figure 19:
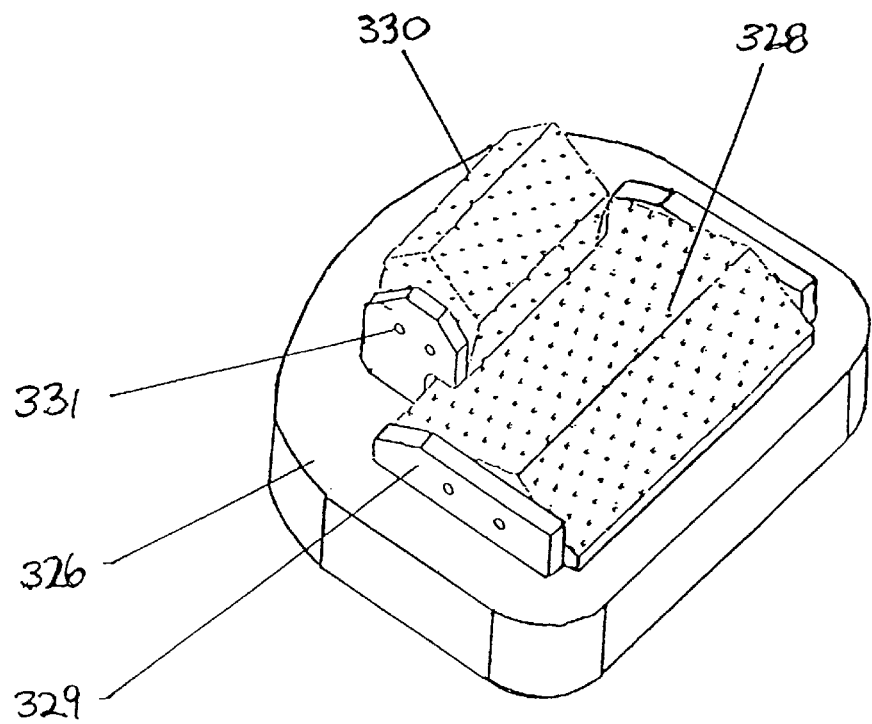
FIG. 19 is a schematic perspective view of a beamsplitter assembly of the microscope of FIG. 17.
Figure 20:
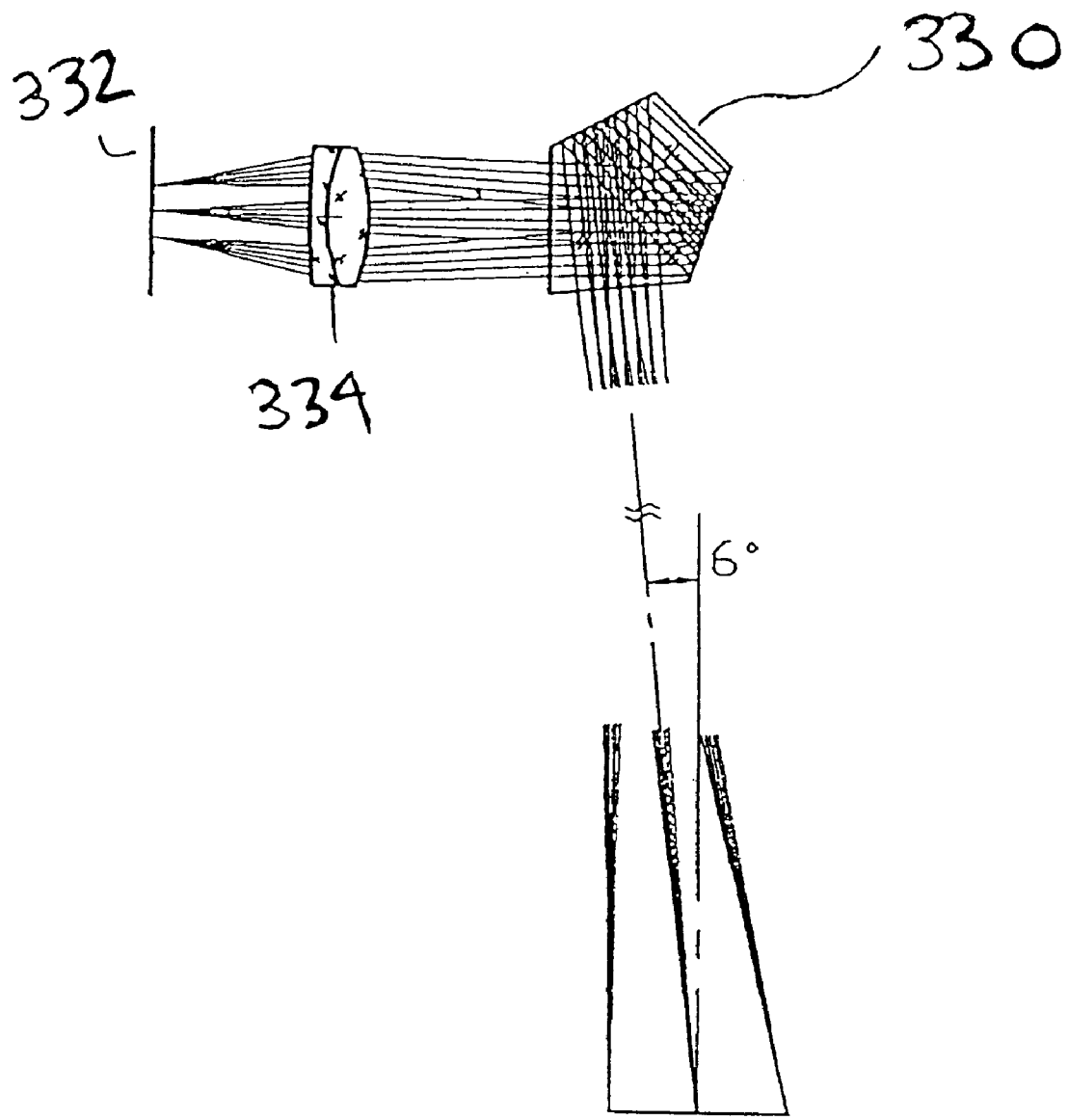
FIG. 20 is a ray trace diagram of the optical path of the microscope according to a fourth embodiment of the invention.

Referring to FIG. 17, a rotatable carousel 321 is provided for mounting a cluster of objective lens pairs 322, 323 as described in the third embodiment. Differing from the third embodiment, a further aperture 324 is provided in addition to a pair of eyepiece apertures 325 through prism bench 326. The eyepiece aperture 325 is located such that a pair of objective lenses 322 can be rotated into an eyepiece active position beneath each aperture 325 (note that lenses 322 are omitted from FIG. 16 for the sake of clarity). The aperture 324 is located such that when the pair of objective lenses 322 are in the eyepiece active position, one objective lens in a pair of objective lenses 323 is in a CCD active position beneath the CCD aperture 324.

A semi-pentagonal eyepiece prism 328 is mounted over the eyepiece aperture 325 by holder 329 so that the stereoscopic image picked up by the eyepiece active objective lenses 323 is redirected (as a beam) to the eyepiece 327. The split ratio for this prism 328 is 1:0. All of the image is reflected to the eyepiece and there is no upwards transmission of light through the prism to reduce the image intensity. A pentagonal CCD prism 130 is mounted over the CCD aperture 324 by holder 331 so that the beam collected by the CCD active objective lens 323 is redirected to the CCD sensor of the camera 332. The split ratio of this prism 330 is also 1:0; all of the light rays are reflected to the image detector 332. As the image detector 332 does not require a stereoscopic image, the other objective lens in the pair 323 is idled.

A positive lens 334 is provided along an optical path between the image detector 332 and the CCD prism 330 for imaging the beam collected by the CCD active objective lens 323 onto the image detector 332 such that the image sensor 332 may be mounted in relative proximity to the CCD prism 330 and the image sensor 332 captures a substantial portion of the image viewable through the eyepiece. A 15 mm diameter photographic lens provides a focal length of 30.8 mm.

Modifications, variations and adaptations may be made to the particular embodiments of the invention described above without departing from the scope of the invention, which is defined in the claims. For example, the carousel may be adapted to mount more or fewer objective lenses than described in the above four embodiments. Various magnifications may be selected for the objective, positive, and eyepiece lenses depending on the preferences of the designer. Different indices of refraction and split ratios may be selected for the variously described prisms.

What is claimed is:

1. An imaging microscope comprising:

(a) a light source;

(b) a specimen stage for holding a specimen;

(c) a specimen magnifying means comprising two objective lenses of equal magnifying power each being positioned along an optical path from the specimen stage for collecting light beams emitted by or transmitted through the specimen;

(d) a pair of eyepieces for forming a stereoscopic image, viewable by a microscope operator, of light beams collected by the specimen magnifying means;

(e) an image detector for capturing an image formed by a light beam collected by the specimen magnifying means;

(f) a beamsplitter assembly positioned along the optical paths from the magnifying means providing three beams of light of equal intensity wherein the image detector and one eyepiece both receive light from one objective lens and the second eyepiece receives a beam of light from the second objective lens;

(g) a positive lens placed along the optical path between the image detector and the beamsplitter assembly for imaging onto the image detector a beam, collected by the specimen magnifying means and transmitted to the positive lens by the beamsplitter assembly, said positive lens being mounted in relatively close proximity to the beamsplitter assembly thereby contributing to the compact design of the microscope, the magnification of said positive lens being selected such that the image detector captures a substantial portion of the image viewable by the eyepiece means;

(h) output means electrically connected to the image detector for providing output signals representative of the image captured by the image detector; and (i) a base and an arm extending generally upwards from the base, wherein the light source is located within the base, the specimen stage is attached to the arm and an optical component housing contains the image detector, the beamsplitter assembly and the positive lens.

2. An imaging microscope comprising:

(a) a light source;

(b) a specimen stage for holding a specimen;

(c) a specimen magnifying means comprising three objective lenses of equal magnifying power arranged so that two beams of light are directed to a pair of eyepieces and one beam of light is directed to an image detector;

(d) said pair of eyepieces forming a stereoscopic image, viewable by a microscope operator, of light beams collected by the specimen magnifying means;

(e) said image detector capturing an image formed by a light beam collected by the specimen magnifying means;

(f) a beamsplitter assembly positioned along one or more optical paths from the magnifying means for directing portions of the light beam collected by the specimen magnifying means to the eyepieces and the image detector;

(g) a positive lens placed along the optical path between the image detector and the beamsplitter assembly for imaging onto the image detector a beam, collected by the specimen magnifying means and transmitted to the positive lens by the beamsplitter assembly, said positive lens being mounted in relatively close proximity to the beamsplitter assembly thereby contributing to the compact design of the microscope, the magnification of said positive lens being selected such that the image detector captures a substantial portion of the image viewable by the eyepiece means;

(h) output means electrically connected to the image detector for providing output signals representative of the image captured by the image detector; and (i) a base and an arm extending generally upwards from the base, wherein the light source is located within the base, the specimen stage is attached to the arm and an optical component housing contains the image detector, the beamsplitter assembly and the positive lens.

* * * * *